US005163399A

United States Patent [19]

Bolander et al.

[11] Patent Number: 5,163,399

[45] Date of Patent: Nov. 17, 1992

[54] METHOD FOR ADJUSTING ENGINE OUTPUT POWER TO COMPENSATE FOR LOADING DUE TO A VARIABLE CAPACITY AIR CONDITIONING COMPRESSOR

[75] Inventors: William J. Bolander, Clarkston; Michael R. Witkowski, Sterling Heights, both of Mich.

[73] Assignee: Saturn Corporation, Troy, Mich.

[21] Appl. No.: 638,300

[22] Filed: Jan. 7, 1991

[51] Int. Cl.[5] .......... F02M 3/07; B60H 3/04

[52] U.S. Cl. .......... 123/339; 62/228.5

[58] Field of Search .......... 62/228.1, 228.5, 230, 62/323.1; 123/357, 358, 359, 339

[56] References Cited

U.S. PATENT DOCUMENTS

| | | | |
|---|---|---|---|
| 3,702,065 | 11/1972 | Jacobs | 62/228.1 |
| 4,488,411 | 12/1984 | Hara | 62/228.5 |
| 4,633,675 | 1/1987 | Sato | 62/228.5 |
| 4,698,977 | 10/1987 | Takahashi | 62/228.5 |
| 4,723,416 | 2/1988 | Suzuki | 62/228.5 |
| 4,862,700 | 9/1989 | Suzuki | 62/228.5 |
| 4,887,570 | 12/1989 | Meicher | 123/339 |
| 4,898,005 | 2/1990 | Sakurai . | |
| 4,955,342 | 9/1990 | Tohmiya | 123/339 |
| 5,018,362 | 5/1991 | Nagase | 62/228.5 |
| 5,022,232 | 6/1991 | Sakamoto | 62/228.5 |
| 5,024,196 | 6/1991 | Ohuchi | 123/339 |

*Primary Examiner*—Carl S. Miller
*Attorney, Agent, or Firm*—Jimmy L. Funke

[57] ABSTRACT

A method is described for adjusting the output power delivered by an internal combustion engine to compensate for variations in engine loading induced by a variable capacity refrigerant compressor of a vehicle air conditioning system. This is accomplished by estimating the change in engine loading due to the compressor, based upon an indication of the engine intake air temperature, and then, adjusting the setting of an engine output power control mechanism, in accordance with the estimate. An estimate for the change in engine loading induced when starting or stopping the variable capacity compressor is derived from a schedule of values based upon the temperature of the engine intake air. An estimate for the change in engine loading induced by the off-idle operation of the variable capacity compressor is derived as a function of the difference between the intake air temperature and a retained previous value for the intake air temperature.

5 Claims, 4 Drawing Sheets

METHOD FOR ADJUSTING ENGINE OUTPUT POWER TO COMPENSATE FOR LOADING DUE TO A VARIABLE CAPACITY AIR CONDITIONING COMPRESSOR

BACKGROUND OF THE INVENTION

This invention relates to a method for controlling an internal combustion engine mounted in a vehicle having an air conditioning system, and more particularly, to a method for adjusting the output power delivered by the engine to compensate for changes in engine loading induced by a variable capacity type air conditioning compressor.

The idling rotational speed of an internal combustion engine is customarily controlled in a closed-loop fashion, by regulating the amount of output power delivered by the engine, in response to a difference between actual engine speed and a desired target idling speed. Any of several standard power control mechanisms may be employed to regulate engine output power for this purpose. For example, it is well known that idle speed can be controlled by regulating an engine control parameter such as ignition spark timing, the amount of fuel supplied to the engine, or the quantity of air inducted into the engine.

In modern computer engine control systems, the engine parameter selected for use in regulating engine output power is normally controlled by a base idle variable retained in computer memory. A change in the value of this base idle variable produces a corresponding change in setting of the engine power control mechanism, which in turn varies the engine parameter being controlled and the output power delivered by the engine. The value of the base idle variable is continuously updated in response to the closed-loop idle control routine, and its assigned value corresponds to the current estimate for the engine control parameter, that will bring the engine to the desired target idling speed, under the present and/or anticipated engine loading conditions. As the engine warms up from a cold start, the base idle variable is usually decreased in value, as a function of the engine coolant temperature, to reduce fuel consumption as the risk of stalling diminishes. It is also common practice to increase the value of the base idle variable by fixed amounts to increase engine output power, in anticipation of significant loads being placed on the engine, such as when a vehicle air conditioner is switched on.

With traditional automobile air conditioning systems, the refrigerant pressure must be regulated to prevent it from becoming too great and rupturing the system. This is normally accomplished by cycling the clutch of the air conditioning compressor on and off, to keep the refrigerant pressure within acceptable limits. This cycling of the compressor results in large, and substantially constant load transients on the vehicle engine. Because these load transients occur very rapidly, the closed-loop idle control is not able to respond rapidly enough to compensate for the changes in loading. This results in large sags and surges in the engine idling speed, when the air conditioning load is applied to and removed from the engine. Thus, it is customary to add or subtract a fixed amount to or from the stored base idle variable, just prior to the engaging or disengaging of the air conditioning compressor clutch, to adjust engine output power in anticipation of the increased or decreased load on the engine, in order to maintain an acceptable idling engine speed.

Recently, a new variable capacity type air conditioning compressor has become commercially available for use in automobiles. This compressor includes a mechanism, whereby its capacity can be varied to adjust the refrigerant pressure. The compressor is designed to minimize its capacity upon starting, and then automatically vary its running capacity to regulate the pressure of the refrigerant to achieve a substantially constant inlet refrigerant pressure. When an air conditioning system employing this type of compressor is switched on, the compressor clutch is engaged and the compressor runs continuously, rather than being cycled on and off. When the ambient temperature is relatively high, the compressor operates at a higher capacity, inducing a relatively large load on the engine, due to the large thermal load on the air conditioning system. On the other hand, when the ambient temperature is low, the thermal load is reduced, and the compressor operates at a lower capacity, thereby reducing its load on the engine.

Because the above described variable capacity compressor induces a variable rather than a fixed engine load, the conventional control technique of adding or subtracting a fixed amount, to compensate the base idle variable for air conditioner loading, can not be used. If the engine is operating at idle, and the compressor has a low starting torque, the addition of too large a fixed amount to the base idle variable will produce an unacceptable surge in engine speed. When the compressor has a higher starting torque, the load will be larger than anticipated by the fixed amount, and engine rotational speed will sag when the load is applied, with possible engine stalling.

An additional problem is encountered when the engine of an automobile equipped with this type of variable capacity air conditioning compressor is operated off-idle. During off-idle engine operation, the air flow to the vehicle components in the engine compartment increases. This increases the capacity of the condenser in the air conditioning system, due to the improved transfer of heat. To compensate for the increased condenser capacity and maintain the refrigerant pressure at the proper level, the compressor reduces its capacity, which in turn reduces the load on the engine. This reduction in air conditioner loading with increased air flow, results in a "sail-on" feeling to the driver, when the engine throttle is closed for a coasting condition, and too great an engine speed, when the engine is returned to idle. This occurs because the closed-loop idle control system is inoperative, when the engine is operated off-idle, and consequently, engine output power is not adjusted to compensate for the reduced loading of the air conditioning system.

Therefore, a need exists for a method of adjusting the output power delivered by an engine, to compensate for changing loading conditions induced by the above described variable capacity air conditioning compressor.

SUMMARY OF THE INVENTION

In accord with this invention, a method is provided for adjusting the output power delivered by an internal combustion engine to compensate for engine load changes induced by a variable capacity type air conditioning refrigerant compressor. The compressor minimizes its capacity upon starting, and thereafter, automatically varies its capacity to regulate the refrigerant pressure. For this kind of compressor, a relationship has been found to exist between the temperature of engine intake air and the changes in engine loading induced by the compressor. Consequently, an estimate for the variation in engine loading is derived from an indication of the engine intake air temperature, and the estimate is then used to adjust the setting of an engine power control mechanism to compensate for the load variation. Because conventional computer engine control systems generally have existing sensors for measuring the temperature of air in the intake manifold, the present invention can be implemented by computer software, without the expense of additional hardware.

According to one aspect of the invention, an estimate for the change in engine loading induced by starting or stopping the operation of the variable capacity compressor is derived from a schedule of values, based upon the current engine intake air temperature. As a result, engine output power is adjusted to more accurately compensate for the variable load transferred to and from the engine, when the compressor is started or stopped, and large surges and sag in engine speed are prevented.

In the preferred embodiment of the present invention, the setting of an engine power control mechanism is adjusted to increase engine output power, in accordance with a scheduled value based on the intake air temperature, when the air conditioning system is switched from an off to an on state, and the engine is functioning according to a first set of predetermined engine operating conditions. When the air conditioning system is switched from the on to the off state, the setting of the power control mechanism is adjusted to decrease engine output power, according to the scheduled value reduced by a prescribed offset. The offset is used only when the engine is operating in accordance with a second set of predetermined operating conditions, and a predefined time has elapsed since the air conditioning system was last switched from the on to the off state. If the predetermined time has not elapsed, or the engine is not operating in accordance with the second set of engine operating conditions, the use of the offset is inhibited when adjusting the setting of the power control mechanism. This feature of the invention provides for a slight overshoot in compensation, when the offset is used, to ensure a small surge in engine speed when removing the compressor load from the engine. The small speed surge is preferable to a sag in engine speed, that could lead to stalling. Inhibiting the use of the offset, until the predefined time elapses, prevents an undesirable build-up in engine speed and output power, that would otherwise occur, when the air conditioning demand switch is repeatedly toggled on an off, during a short interval of time.

According to another aspect of the invention, an estimate for the variation in engine loading induced by the off-idle operation of the variable capacity compressor is derived as a function of the difference between the engine intake air temperature and a previously indicated value for the intake air temperature. Thus, engine output power can be adjusted to compensate for the decrease in compressor loading that results from the increase air flow to the air conditioning condenser, during off-idle engine operation. As a consequence, the "sail-on" feeling experienced under closed throttle coasting is eliminated, and engine speed will be closer to the desired value, when the engine returns to idle.

In the preferred embodiment of the invention, values for the setting of the power control mechanism and the associated intake are temperature are retained, when (A) the engine is operating under idling conditions, and (B) the air conditioning system is switched from an off to an on state and the engine not operating under idling conditions. The setting of the engine power control mechanism is then adjusted to the most recently retained value for the setting of the power control mechanism, decreased by a scheduled amount, which depends upon the difference between the current intake air temperature and the most recently retained value for the intake air temperature. This adjustment is effectuated only when (A) the engine is not operating under idling conditions, (B) the compressor is operational, and (C) at least a predetermined period of time has elapsed since the last adjustment of the power control mechanism based upon the difference between the intake air temperature and the most recently retained value for the intake air temperature. The requirement that at least a predetermined period of time must have elapsed, since the previous adjustment of this type to the output power, ensures that the engine has sufficient time to respond to the previous adjustment, before initiating a new one.

In the preferred embodiment of the present invention, the engine power control mechanism includes an adjustable valve in the engine air intake system, for varying the quantity of engine intake air in order to regulate engine output power. The method provided by the present invention does not require this particular engine power control mechanism. Thus, the principles of the present invention are easily adaptable to other known mechanisms for controlling engine output power, such as those used for adjusting spark ignition timing or the amount of fuel supplied to an engine.

These and other aspects and advantages of the invention may be best understood by reference to the following detailed description of the preferred embodiments when considered in conjunction with the accompanying drawings.

DESCRIPTION OF THE PREFERRED EMBODIMENT

Figure 1:
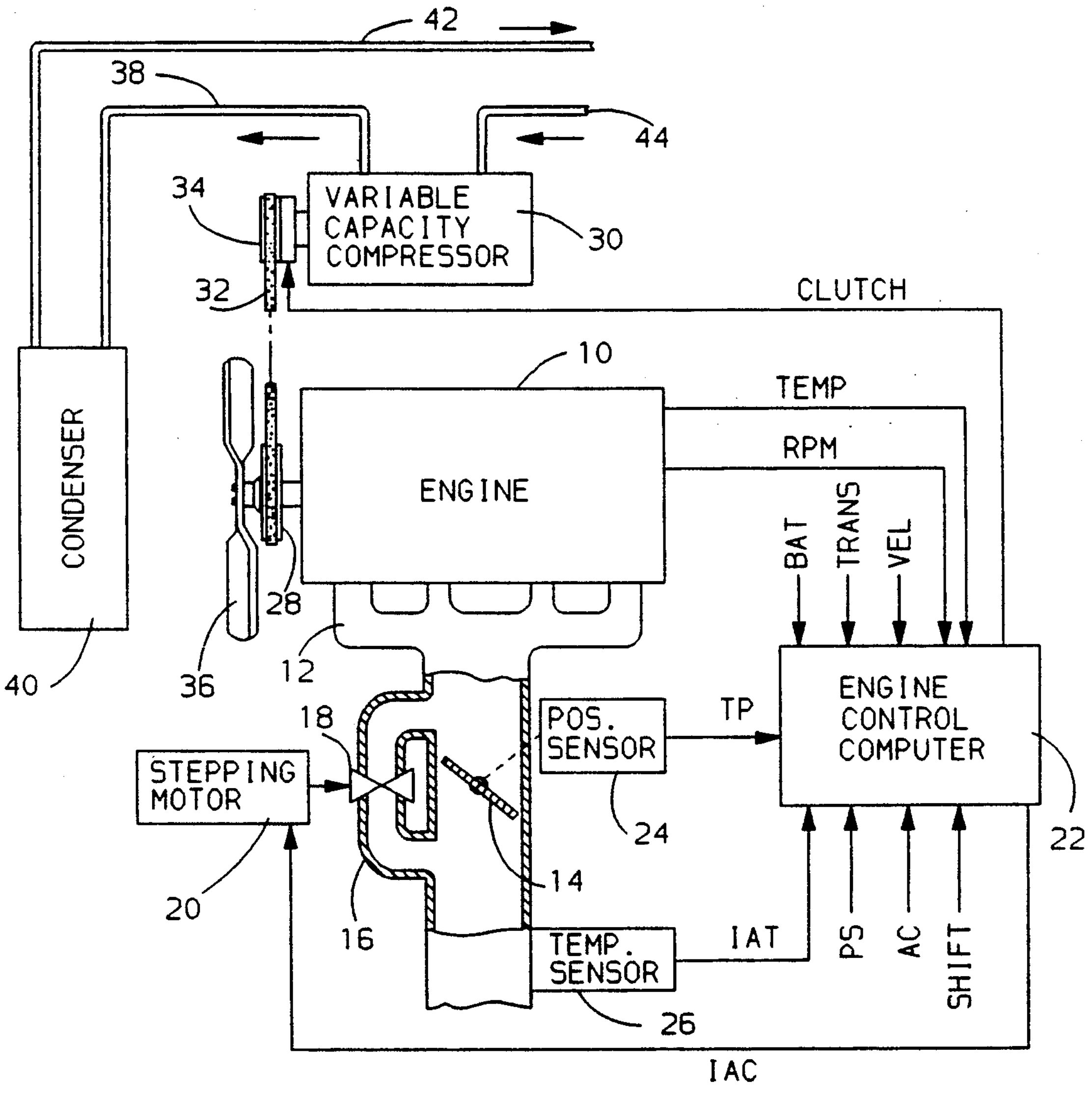
FIG. 1 is a schematic diagram of an internal combustion engine and a control system for adjusting the output power delivered by the engine, to compensate for changes in loading induced by a variable capacity refrigerant compressor, in accordance with the principles of the present invention.

The present invention will now be described with reference to the embodiment illustrated in FIG. 1, which schematically shows an internal combustion engine 10, along with a portion of its associated air intake system 12. A rotatable throttle plate 14 is provided within the air intake system 12 for regulating the primary air flow into the engine 10. The air intake system 12 further includes a passage 16, which bypasses throttle plate 14, for supplying auxiliary air to engine 10. Disposed within passage 16 is an standard air bypass valve 18, for restricting the amount of auxiliary air flowing into the engine 10. A Stepping motor 20 is mechanically coupled to the bypass value 18 for effectuating the degree of valve opening, and consequently, the quantity of auxiliary air flow to engine 10.

Engine 10 is further provided with a rotating output pulley 28 for driving a variable capacity air conditioning refrigerant compressor 30. A cooling fan 36, for drawing air into the vehicle engine compartment (not shown), may be driven directly by engine 10, as indicated in FIG. 1, or alternatively it may be driven indirectly through the use of an electric motor. A drive belt 32 links the engine output pulley 28 to an electrical clutch 34, which is mounted on a shaft for driving the variable capacity compressor 30. When the clutch 34 is engaged, the variable capacity compressor 30 functions to compress refrigerant gas, which then passes through the compressor outlet tube 38 to a condenser 40. After being liquefied in condenser 40, the refrigerant passes through tube 42, to the remainder of a conventional vehicle air conditioning system (not shown), and eventually returns to compressor 30 through the compressor inlet tube 44.

Also, shown in FIG. 1 is a convention engine control computer 22 for controlling the operation of engine 10. Included within the control computer 22 are standard elements, such as a central processing unit, random access memory, read only memory, non-volatile memory, analog-to-digital converters, digital-to-analog converters, input/output circuitry, and clock circuitry. The engine control computer 22 functions in a known fashion in controlling the performance of engine 10, by determining the proper spark timing (in spark ignition engines), and assuring that the charge delivered to each engine cylinder has the correct air-fuel ratio.

Engine control computer 22 receives several input signals related to the operation of engine 10. A conventional throttle position sensor 24, such as a potentiometer, is mechanically linked to throttle plate 14, and provides an input signal TP, which indicates the degree of opening of the throttle plate 14. A standard air temperature sensor 26 is disposed near the air inlet of the intake system 12, and provides a computer input signal IAT, representing the engine intake air temperature. The manifold air temperature (MAT), closer to the engine, is usually required by conventional engine control systems, and can be derived by known calibration techniques from the intake air temperature signal IAT. Alternatively, a conventional MAT sensor could be employed, and the air intake temperature IAT could then be derived from the corresponding MAT signal. In either case, a single temperature sensor can be employed to provide an indication of both the intake air temperature and the manifold air temperature.

The other computer input signals indicated in FIG. 1 are obtained in a standard fashion from conventional automotive sensors that have not been specifically shown. A TEMP input signal is derived from a standard temperature sensor, that is disposed in the engine coolant system to provide computer 22 with an indication of the temperature of the engine coolant fluid. The rotational speed of engine 10 is indicated by a RPM signal that can be derived from any known speed sensor, such as a toothed wheel rotated by engine 10 past an electromagnetic sensor, to detect the passage of the teeth on the wheel. A VEL input signal represents the velocity of the vehicle in miles per hour (MPH), and can be derived, for example, from a commercial speed transducer mounted on the vehicle transmission. An AC input signal indicates the state of a standard air conditioning request switch used to turn the air conditioning system on and off. Input signal PS indicates the pressure of fluid within a conventional vehicle power steering system, and can be derived from a standard fluid transducer. The TRANS input signal is derived from a conventional speed transducer and represents the turbine speed in an automatic transmission, which may be coupled to engine 10. By utilizing the TRANS and RPM input signals, computer 22 can determine the amount of clutch slippage in the automatic transmission, which is related to the transmission fluid pressure. The BAT input signal provides computer 22 with an indication of the vehicle battery voltage. Finally, the input signal SHIFT indicates the position of the transmission shift mechanism, which can be obtained from a conventional position switch.

Two particular output signal are developed by computer 22 for controlling the interaction of engine 10 with the variable capacity air conditioning compressor 30. The first is a CLUTCH output signal for actuating the electrical clutch 34 of compressor 30. When the CLUTCH signal is on, the clutch 34 is engaged so that engine 10 drives compressor 30. When the CLUTCH signal is off, the clutch 34 is disengaged, and compressor 30 is not driven by engine 10. The second output signal developed by computer 22 is an idle air control signal IAC, which in the preferred embodiment steps motor 20, to open or close bypass valve 18, thereby controlling the amount of auxiliary air flowing into engine 10.

In practice, the engine control computer 22 requires several additional input and output signals that are not directly related to the present invention. These additional signal have not been included in FIG. 1, to simplify the present description and maintain clarity.

The idling rotational speed of an engine 10 is controlled in a closed-loop fashion, by regulating the amount of engine output power, in response to a difference between actual engine speed (provided by the RPM signal) and a desired target idling speed (programmed into computer memory). In general, any of several standard power control mechanisms may be employed to regulate engine output power for this purpose. For example, it is well known than idle speed can be controlled by regulating an engine control parameter such as the ignition spark timing, the amount of fuel supplied to the engine, or the quantity of air inducted into the engine.

In the preferred embodiment of the present invention, as illustrated in FIG. 1, the quantity of air inducted into engine 10 was selected as the engine control parameter to be used in regulating the engine output power, for idle speed control. The air bypass valve 18, which controls the amount of auxiliary air flowing into engine 10, was selected as the preferred engine power control mechanism for adjusting engine output power. As will be recognized by those skilled in the art of engine control, the present invention can be easily adapted to other idle control systems, which use different power control mechanisms to regulate engine control parameters, such as the ignition spark timing or the amount of fuel supplied to engine 10.

The engine parameter selected for use in regulating engine output power (quantity of inducted air in this case) is typically controlled by the value of a base idle variable stored in the random access memory of the engine control computer 22. A change in the value of this base idle variable produces a corresponding change in the associated engine parameter being controlled, which in turn varies the output power delivered by the engine. In the preferred embodiment, this base idle variable has a value, which representing the number of steps corresponding to the position or setting of stepping motor 20. Engine control computer 22 moves stepping motor 20 to the position or setting designated by the base idle variable via output signal IAC, which in turn adjusts the opening of air bypass valve 18 and the amount of auxiliary air flowing into engine 10. As the auxiliary air flow is increased, computer 22 increases the amount of fuel delivered to each engine cylinder to maintain the correct air-fuel ratio, which produces an increase in engine output power and rotational speed. Likewise, when the auxiliary air flow is reduced, the amount of fuel supplied to the engine is decreased, which reduces the engine output power and rotational speed.

According to conventional practice, the base idle variable (setting of stepping motor 20) is continuously updated in response to the closed-loop idle control routine stored in the read only memory of computer 22. The value assigned to the base idle variable represents the current estimate for the engine control parameter (quantity of auxiliary intake air), that will bring the engine to the desired target idling speed, under the present and/or anticipated engine loading conditions. As the engine warms up from a cold start, the base idle variable is usually decreased in value, as a function of the engine coolant temperature, as provided by the TEMP input signal, to reduce engine fuel consumption as the risk of stalling diminishes. It is also common practice to increase the value of the base idle variable by a fixed amount (a predetermined number of steps), to increase engine output power, in anticipation of significant load being placed on the engine, such as when a vehicle air conditioner is switched on.

In vehicle air conditioning systems employing conventional fixed capacity refrigerant compressors, it is customary to cycle the compressor clutch on and off, while the air conditioner is switched on, in order to prevent the refrigerant pressure from becoming too large and rupturing the system. This cycling of the fixed capacity compressor results in large, and substantially constant load transients on the vehicle engine. Because these load transients occur very rapidly, the closed-loop idle control is not able to respond rapidly enough to compensate for the changes in loading. This results in large sags and surges in the engine idling speed, when the air conditioning load is applied to and removed from the engine. Consequently, it is customary to add or subtract a fixed amount to or from the stored base idle variable (stepping motor setting), just prior to the engaging or disengaging of the air conditioning compressor clutch, to anticipate and compensate for the increased or decreased load on the engine, and maintain an acceptable idling engine speed.

Recently, a new variable capacity type refrigerant compressor 30, illustrated in FIG. 1, has become commercially available for use in automobiles. This compressor includes a mechanism, whereby its capacity can be varied to change the refrigerant discharge pressure. The compressor is designed to minimize its capacity upon starting, and then automatically vary its running capacity to achieve a substantially constant refrigerant pressure at the compressor inlet. When an air conditioning system employing this type of compressor is switched on, the compressor clutch is engaged and the compressor runs continuously, rather than being cycled on and off. If the ambient temperature is relatively high, the compressor operates at a higher capacity, which induces a relatively large load on the engine, due to the greater thermal load on the air conditioning system. On the other hand, when the ambient temperature is low, the thermal load on the air conditioning system is reduced, and the compressor will operates at a lower capacity, thereby reducing its load on the engine.

With this variable capacity compressor 30, the traditional technique of adding or subtracting a fixed amount to or from the base idle variable can not be used to compensate for compressor loading. When engine 10 is operating at idling speed and the compressor 30 has a low starting torque, the addition of too large a fixed amount to the base idle variable will produce an undesirable surge in engine speed, before the closed-loop idle control system can respond to reduce idling speed. On the other hand, when the starting torque of compressor 30 is larger than anticipated by the fixed amount, engine speed will sag when the compressor is started, and the engine may stall before the closed-loop idle control system can respond to increase idling speed.

The present invention offers a solution to the above stated problem, by providing a method for adjusting the output power delivered by engine 10, to compensate for the changes in loading induced by the variable capacity compressor 30. A relationship was found to exist between the variations in engine loading induced by the above described variable capacity compressor 30 and the temperature of air inducted into engine 10. It was then found that the engine output power could be adjusted to compensate for the variable load changes by: (1) deriving an indication of the engine intake air temperature; (2) deriving an estimate for the variation in engine loading induced by the variable capacity compressor, based upon the indicated engine intake air temperature; and (3) adjusting the setting of the engine power control mechanism in accordance with the estimate for the variation in engine loading.

When clutch 34 is engaged to start compressor 30, it operates at minimum capacity, due to a return spring in its internal capacity adjusting mechanism. As a result, the starting torque for compressor 30, and the corresponding change in engine loading, is primarily determined by the initial pressure of the refrigerant being compressed. Consequently, an estimate for the compressor starting torque can be obtained as a function of the engine air intake temperature, since the initial refrigerant pressure in the closed vehicle air conditioning system is directly related to the air temperature in the vehicle engine compartment.

Figure 2:
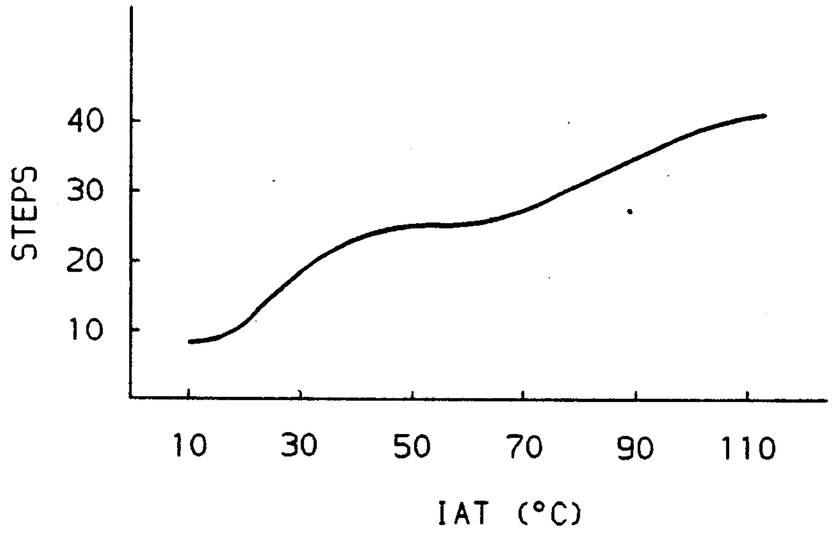
FIG. 2 is graph representing the number of steps of adjustment made to the stepping motor driving the idle air bypass valve illustrated in FIG. 1, to compensate for the variation in engine loading induced by starting and stopping the operation of the variable capacity refrigerant compressor.

Referring now to FIG. 2, there is shown a graph of the number of steps to be added to the position or setting of the stepping motor 20, just prior to engaging clutch 34, in order to increase the engine output power and compensate for the starting torque of compressor 30. For each value of intake air temperature, the indicated number of steps was found experimentally to provide the proper compensation for the particular engine 10 and compressor 30 tested. It will be recognized this data will vary depending upon the type engine and compressor employed.

When clutch 34 is disengaged to stop the operation of compressor 30, the load on the engine 10 is reduced by the amount required to drive compressor 30. It has been found that the number of steps indicated in the graph of FIG. 2 can be subtracted from the setting or position of motor 20, just prior to disengaging clutch 34, to provide acceptable compensation for the reduced engine load, when compressor 30 is stopped. In most instances, however, it was found desirable to reduce the number of steps indicated in the graph of FIG. 2, by a small fixed offset. This produces a slight overshoot in compensation, and ensures a slight surge in engine speed, which is more desirable than a speed sag, which could stall the engine.

Use of the prescribed offset is inhibited, when a predefined time has not elapsed, since the last time the air conditioning system was switched from the on to the off state. This condition was found necessary to prevent an undesirable step-up in engine output power, that can occur when compressor 30 is repeatedly started and stopped in a relatively short period of time. For example, if the air conditioning request switch is continuously toggled on and off, without inhibiting the use of the offset, more steps would be added to the setting of stepping motor 20, than would be subtracted, for each set of on and off transitions. When this occurs repeatedly in a short period of time, the closed-loop idle control system is unable to respond quickly enough to prevent the build-up of engine output power and speed. In addition, it has also been found desirable to inhibit the use of the offset under certain engine operating conditions that indicate the current setting of the stepping motor may already be to large. Examples of these operating conditions will be described at a later point in the description.

Figure 3:
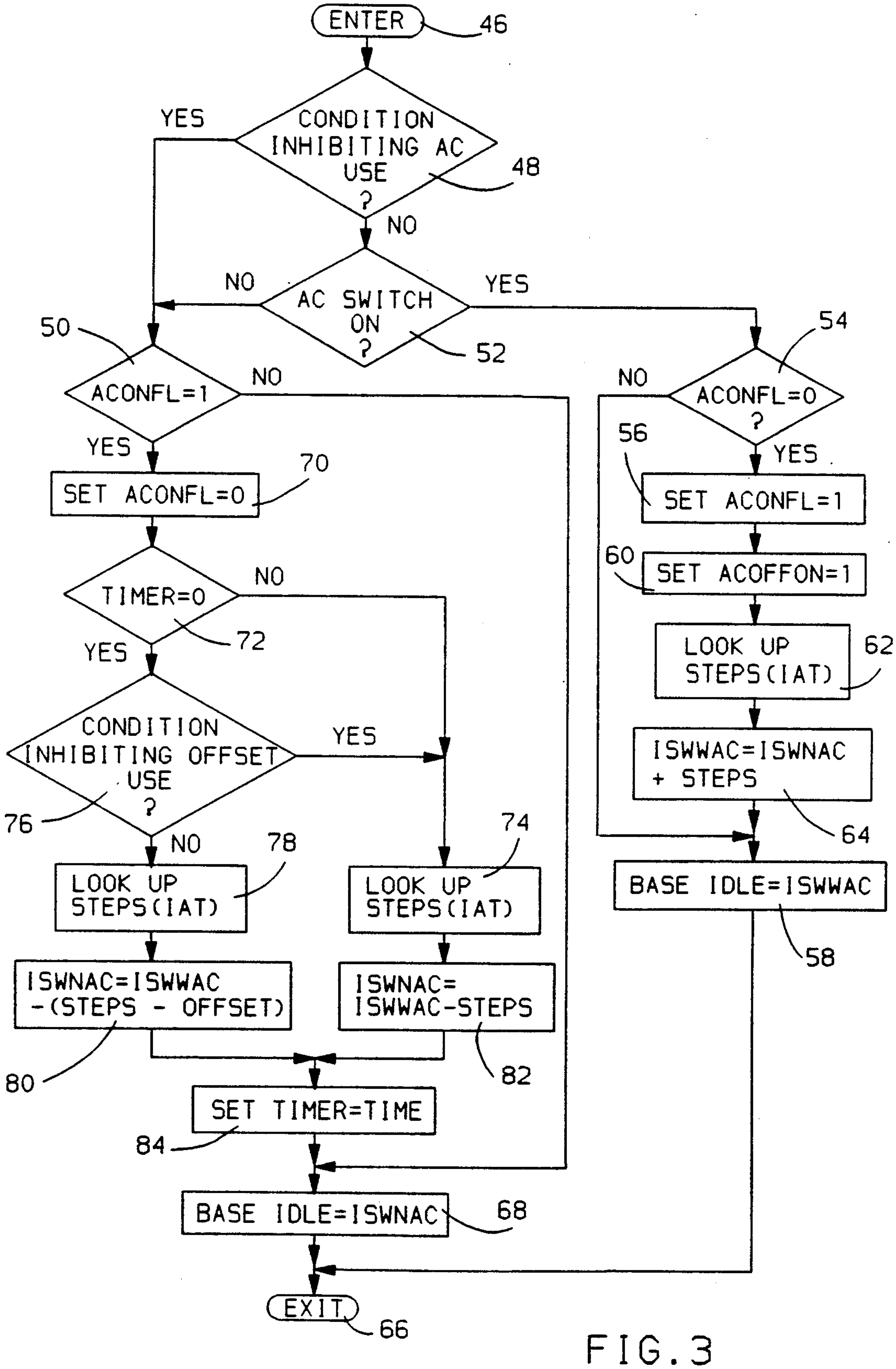
FIG. 3 is a flow diagram representative of the instructions in a routine executed by the engine control computer in FIG. 1, when adjusting engine output power to compensate for variations in loading induced by starting and stopping the operation of the variable capacity refrigerant compressor.

Thus, according to one feature of the present invention, the output power developed by engine 10 can be adjusted to compensate for the variation in engine loading induced by starting or stopping the operation of variable capacity refrigerant compressor 30. Shown in FIG. 3 is a flow diagram representative of the steps in a routine carried out by computer 22, when compensating for load changes due to the starting and stopping of compressor 30. This routine forms a portion of the background control loop, which is repeatedly executed by computer 22 in controlling the operation engine 10. All flags, timers, counters, and the appropriate variables are properly initialized, prior to entering the background loop, when the engine is started.

The routine is entered at point 46, and immediately proceeds to step 48, where a decision is required as to whether an engine operating condition exists, which will have inhibited the operation of the vehicle air conditioning (AC) system. Examples of such conditions would be where computer 22 detects that: (1) the engine is already significantly loaded by a power steering cramp, as indicated by the PS input signal from the power steering system; (2) the temperature of the engine coolant is above a high temperature limit (for example, 117° C.) based upon the TEMP input signal, indicating that engine 10 may be damaged by applying additional loading; and (3) the engine intake air temperature is below a defined low temperature (for example, 11° C.), where operation of compressor 30 could result in damage. If any of these AC inhibiting conditions are occurring, then the routine proceeds to step 50. Otherwise, the program proceeds to step 52 and engine 10 is said to be operating according to a first set of predetermined operating conditions, i.e. those which do not inhibit the operation of the vehicle air conditioning system.

At step 52 a decision is required as to whether the air conditioning AC request switch is in the on or off position. This decision is made based upon the state of the AC input signal to computer 22. If the AC switch is on, the routine proceeds to step 54, otherwise, it passes to step 50, when the AC switch is off.

When the routine proceeds to step 54, a decision is required as to whether an ACONFL flag is set to a value of zero. The ACONFL is initialized to zero prior to the first pass through the routine. When ACONFL is zero, this indicates that the air conditioning request switch has just been switched from an off to an on state, and the engine output power should be appropriately increased to compensate for starting of compressor 30, just prior to when computer 22 engages clutch 34 via the CLUTCH output signal. When ACONFL is not equal to zero, this indicates that the air conditioning switch is in the on state, but it has been on for at least one previous pass through the routine, and compensation is not required. Thus, if ACONFL equals zero, the routine passes to step 56, and if ACONFL is not equal to zero, it passes to step 58.

At step 56, the ACONFL flag is set from zero to a value of one, indicating that air conditioning request switch will have been on for at least one pass through the routine.

Next at step 60, another flag ACOFFON is set from its initialized value of zero to a value of one. The ACOFFON flag is set to one, in order to indicate that a the air conditioning request switch has just been switch from the off to the on state, and its use will be described at a later point, when discussing FIG. 6.

From step 60, the routine proceeds to step 62, where a value for STEPS is looked up from a schedule stored in read only memory, as a function of the current intake air temperature indicated by the IAT input signal. The values for this look up table are derived from the graph presented in FIG. 2. Thus, STEPS represents the number of steps to be added to the setting of the stepping motor 20 to compensate for the starting of compressor 30.

Next at step 64, a variable ISWWAC is set equal to the current value of a variable ISWNAC, plus the value for STEPS obtained previously at previous step 62. ISWWAC represents the setting for the stepping motor 20 when the air conditioning system is operational, while ISWNAC represents the setting when the air conditioning system is turned off. Values for the variables ISWWAC and ISWNAC are stored in the non-volatile memory of computer and are continuously updated by the closed-loop idle control system, when the engine is operating under idling conditions.

The routine then proceeds to step 58, where the BASE IDLE variable is set equal to ISWWAC. Computer 22 then adjusts the setting of the stepping motor 20 to correspond to the value of the BASE IDLE variable, which has been increased by STEPS to compensate for the increase in engine loading induced by starting compressor 30.

When the routine proceeds to step 58, by way of step 54, the BASE IDLE variable is again set equal to ISWWAC, which will already have been compensated during a previous pass through the routine. From step 58, the routine is exited at point 66.

Returning now to step 50, which is entered by way of step 48 or step 52, when either an operating condition occurs to inhibit the use of the air conditioner, or the air conditioner request switch is in the off position. At step 50, a decision is required as to whether the flag ACONFL is equal to one. In this portion of the routine, when ACONFL is equal to one, this indicates that the air conditioning system has just been switched from an on to an off state, either by way of the request switch, or one of the inhibiting conditions. If ACONFL is not equal to one, then the air conditioning system has been in the off state for at least one previous pass through the routine. When ACONFL equals one, the routine proceeds to step 70, otherwise it proceeds to step 68, where the BASE IDLE variable is assigned the current value of ISWNAC, and the routine then exists at point 66.

However, if the routine proceeds to step 70, the ACONFL flag is set from a value of one to a value of zero, indicating that the air conditioning system will have been turned off for at least one previous pass through the routine.

Next at step 72, a decision is required as to whether a count down TIMER has been decremented to a value of zero, from a value of TIME set during a previous pass through this portion of the routine (see step 84). For the first pass through the routine, TIMER will have been set to zero during initialization. The value of TIMER is checked to determine if the predefined period of TIME has elapsed, since it was originally set to the value of TIME. This is the period of time discussed previously, during which the use of the offset is inhibited when compensating for the stopping of compressor 30. If this is the first pass through this portion of the routine, or the previously set predefined period of TIME has elapsed, TIMER will be equal to zero and the routine proceeds to step 76. However, if TIMER is not equal to zero, the routine passes to step 74.

When the routine proceeds to step 76, a decision is required as to whether the engine is operating under any condition, where the use of the offset should be inhibited when compensating for the reduction in engine load due to stopping the operation of compressor 30. Examples of such conditions would be where computer 22 detects via its input signals that: (1) the closed-loop idle control system has increased the target idling speed to compensate for low battery voltage, low transmission fluid pressure, the engine operating too hot, or the engine operating too cold; (2) an automatic transmission coupled to engine 10 is shifted into park or neutral; (3) the operation of compressor 30 has been prohibited because the intake air temperature is below a defined low temperature (for example, 11° C.); (4) the temperature of the engine coolant is above a high temperature limit (for example, 117° C.); (5) a power steering cramp is occurring; (6) the engine is not operating under idling conditions during the present pass through this portion of the routine, and the offset was used once, just as the engine left idle (i.e. one off-idle use of the offset is allowed, each time the engine just leaves idle, and then its use is prohibited, until the engine again returns to idle); or (7) the engine is operating under idling conditions, but the actual engine idling speed minus the desired target idling speed is greater than a maximum upper idle speed limit. If the engine is operating under any of these conditions, the routine proceeds to step 74. However, when the engine is not operation under any of conditions, the routine proceeds to step 78, and the engine is said to be operating under a second set of predetermined operating conditions, i.e. conditions not inhibiting the use of the offset.

When the routine proceeds to step 78, a value for STEPS is looked up in the schedule stored in memory as a function of the current intake air temperature IAT, as described previously at step 62.

Next at step 80, the variable ISWNAC is set equal to the current value for the variable ISWWAC, minus an amount equal to the value of STEPS reduced by a predetermined OFFSET. ISWNAC then represents the setting for the stepping motor 20 when the air conditioning system is not operational. This new value for the variable ISWNAC is then stored in the non-volatile memory of computer and is updated by the closed-loop idle control system, when the engine is operating under idling conditions. In the preferred embodiment, a value of 3 to 5 steps was found satisfactory for the OFFSET.

If either the TIMER is not equal to zero at step 72, or the engine is operating under one of the conditions inhibiting the use of the OFFSET at step 76, the routine will have proceeded to step 74. At step 74, a value for STEPS is looked in the stored schedule, based upon the current intake air temperature, as described previously. The routine then proceeds to step 82.

At step 82, the variable ISWNAC is set equal to the current value for the variable ISWWAC, minus the value of STEPS found at step 74. Here the OFFSET is not used, due to the decisions made at either step 72 or step 76.

From either step 80 or step B2, the routine passes to step 84, where the TIMER is set to the value of TIME. Until the TIMER counts down to a zero, the use of the OFFSET for compensation will be prohibited (at step 72). In the preferred embodiment, TIME was selected to be 5 seconds, with TIMER counting down in one second increments. The 5 second period assigned to TIME was found sufficient to enable the closed-loop idle control system to correct the setting of stepping motor 20 and prevent the undesirable build-up in engine output power discussed earlier.

Next at step 68, the BASE IDLE variable is assigned the value of ISWNAC and computer 22 adjusts the setting of stepping motor 20 to correspond to the number of steps represented by the BASE IDLE variable. The routine then exits at point 66.

In summary, the above described routine adjusts the setting of stepping motor 20 to increase or decrease engine output power to compensate for the starting or stopping of the variable capacity refrigerant compressor 30, based upon the temperature of the engine intake air. Computer 22 appropriately delays changes in the output CLUTCH signal, so that the adjustments to compensate engine output power have time to take effect, before compressor clutch 34 is engaged or disengaged.

When the engine 10 of an automobile equipped with the above type variable capacity compressor 30 is operated off-idle, an additional problem is encountered. In the preferred embodiment, the engine is operated off-idle by either increasing the opening of throttle plate 14 from its idle stop position, or by increasing the velocity of the vehicle above zero. In either case, engine fan 36 operates at a higher speed and the air flow to components in the vehicle engine compartment increases above that at engine idle. This increases the capacity of the air conditioning condenser 40, by improving the transfer of heat. To compensate for the increased capacity of the condenser 40, and maintain the refrigerant pressure at the desired level, the compressor 30 reduces its capacity, which in turn reduces the load on the engine 10. This off-idle reduction in air conditioner loading results in a "sail-on" feeling to the driver, when the throttle 14 is closed in a coasting condition; or too great an engine speed, when engine 10 returns to idling conditions. This occurs because the closed-loop idle control system is inoperative, when the engine is operated off-idle, and consequently, engine output power is not adjusted to compensate for the reduced compressor loading.

According to another feature of the present invention, an estimate for the off-idle decrease in engine loading associated with the operation of compressor 30, is also derived from the indicated engine intake air temperature. The engine control mechanism is then adjusted based upon this estimate, to decrease engine output power and compensate for the reduced compressor loading.

Figure 4:
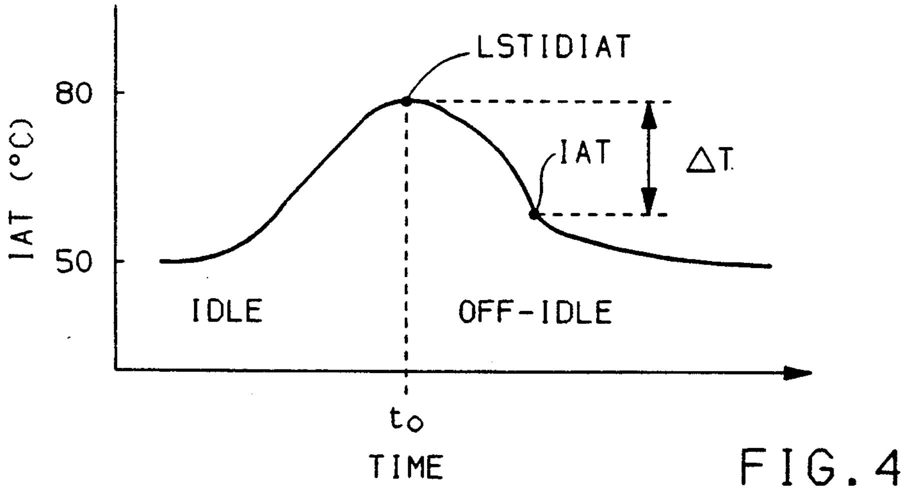
FIG. 4 provides a graph showing a typical variation of engine intake air temperature versus time, when the engine operates under idling and off-idling conditions.

Referring now to FIG. 4, there is shown a graph illustrating the typical behavior of engine intake air temperature IAT as a function of time, when the engine 10 is first operated under idling conditions, and then under off-idling conditions (after a time $t_0$) As the engine is continuously operated at idle, the intake air temperature in the engine compartment increases, due to heating by the engine 10. When the engine 10 is then operated off-idle, the increased air flowing into the engine compartment cools the intake air temperature IAT as indicated in FIG. 4. It has been found that this off-idle cooling of the intake air temperature is related to the increase in the capacity of condenser, and the corresponding reduction in engine loading, when compressor 30 decreases its capacity.

Figure 5:
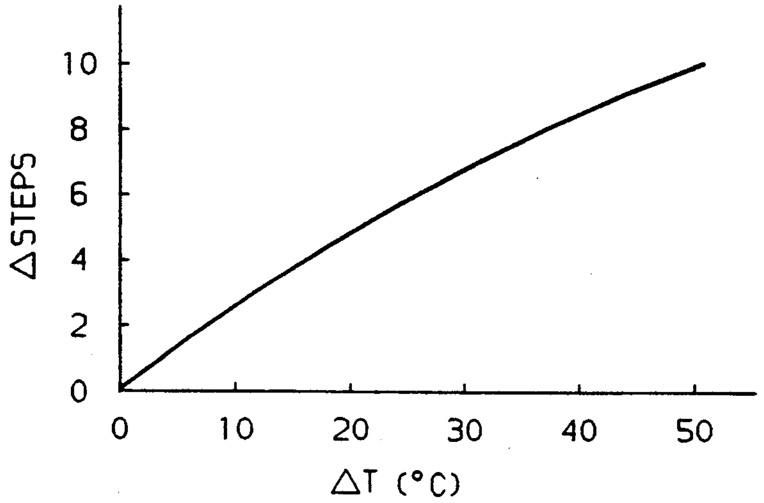
FIG. 5 is a graph representing the number of steps of adjustment made to the stepping motor driving the idle air bypass valve illustrated in FIG. 1, to compensate for variations in engine loading induced by the off-idle operation of the variable capacity refrigerant compressor.

More particularly, the estimate for the off-idle decrease in compressor loading is derived as a function of the difference ΔT between the currently indicated air intake temperature IAT and a previously indicated value for the intake air temperature LSTIDIAT, which is usually obtained when the engine was last operated under idling conditions (see FIG. 4). Generally, the most recent value for the idle setting of the power control mechanism LSTIDMP, and the corresponding value for the intake air temperature LSTIDIAT are retained in computer memory. Then, for a particular value of off-idle intake air temperature IAT, the setting of the power control mechanism is adjusted to the most recently retained value for the power control setting, decreased by a scheduled amount ΔSTEPS, that depends upon the difference ΔT, as shown by the experimentally obtained graph presented in FIG. 5. This adjustment is effectuated, only when (A) the variable capacity refrigerant compressor 30 is operational, (B) the engine is not operating under idling conditions, and (C) a least a predetermined period of time has elapsed since the last off-idle adjustment to the setting of the power control mechanism based upon the difference in temperatures ΔT.

In the specific instance where, the engine is not operating under idling conditions and the air conditioning system is then switched from an off to an on state, the most recently retained idle values for the setting of the power control mechanism and the associated intake air temperature may not have been updated for a relatively long period of time, during which the engine operating conditions may have changed significantly. In this special case, it has been found necessary to replace the most recently retained idle values with the current off-idle setting for the power control mechanism and intake air temperature, since these current values have just been used to compensate for the starting of compressor 30, and they provide a more accurate representation of the current engine operating conditions.

Figure 6:
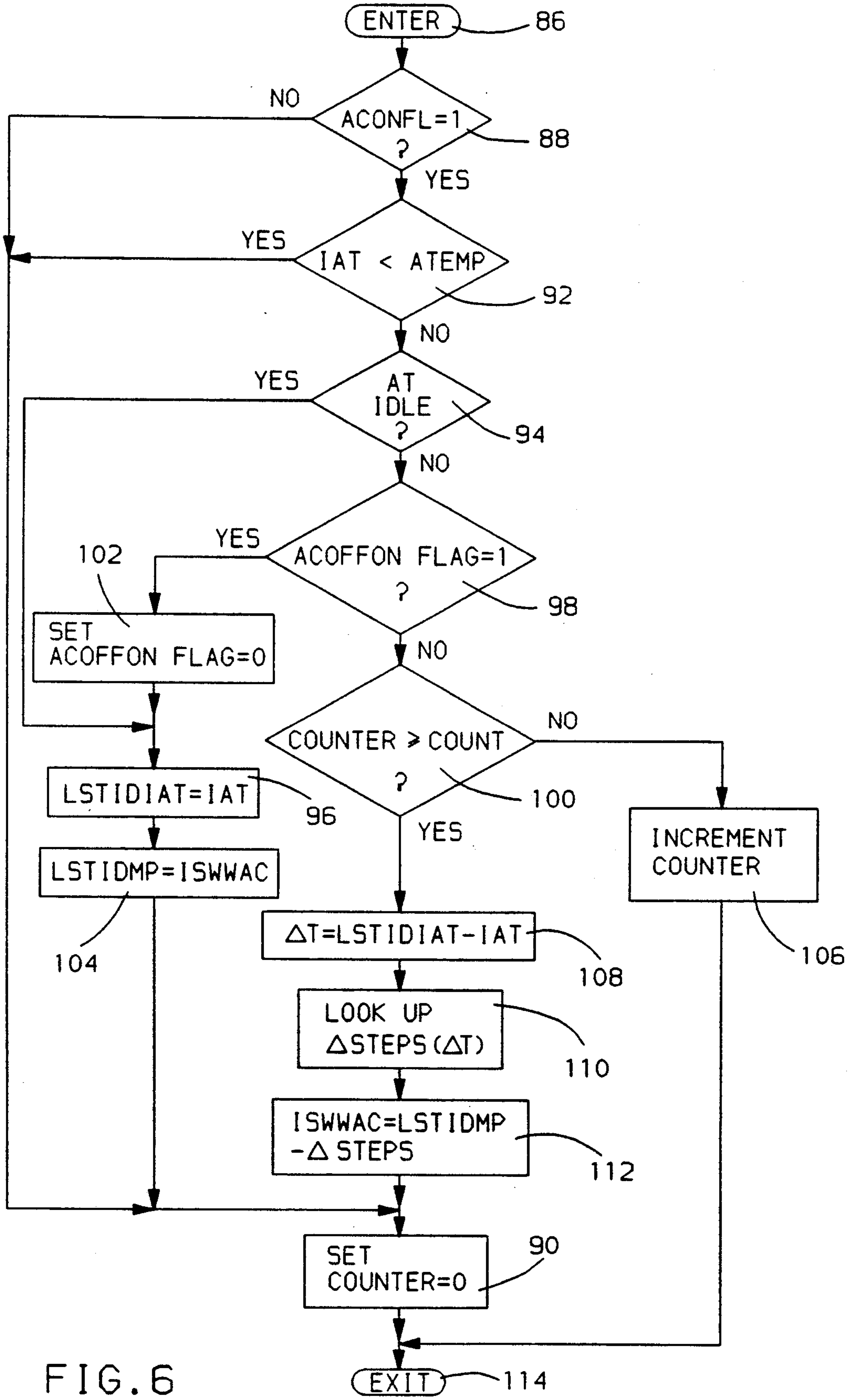
FIG. 6 is a flow diagram representative of the instructions in a routine executed by the engine control computer in FIG. 1, when adjusting engine output power to compensate for variations in loading induced by the off-idle operation of the variable capacity refrigerant compressor.

Shown in FIG. 6 is a flow diagram representative of the steps in a routine carried out by computer 22, when compensating for off-idle load changes induced by the operation of variable compressor 30 in accordance with the principles of the present invention. As with the previously described routine of FIG. 3, the present routine also forms a portion of the background control loop, which is repeatedly executed by computer 22 in controlling the operation engine 10. The routine is entered at point 86 and proceeds to step 88.

At step 88, a decision is required as to whether the ACONFL flag is equal to one, which is a required condition for compressor 30 to be operational. If ACONFL is equal to zero, compressor 30 is not operational and the routine proceeds to step 90. If ACONFL is equal to one, the routine proceeds to step 92, to check an additional condition required for compressor 30 to be operational.

At step 92, a decision is required as to whether the engine intake air temperature IAT is below a defined low temperature (for example, 11° C.), where operation of compressor 30 could result in damage. If IAT is below this defined low temperature, operation of compressor 30 will have been inhibited, even though the ACONFL is equal to one, and the routine proceeds to step 90. If IAT is not below the defined low temperature, the routine proceeds to step 94.

At step 94 a decision is required as to whether the engine is operating under idling conditions. For the embodiment of the present invention illustrated in FIG. 1, idling conditions occur when throttle plate 14 is closed against its idling stop, and the vehicle is at rest, with the computer input signal VEL=0. When the vehicle is operating at idle, the routine proceeds to step 96. However, when the engine is not operating under idling conditions, the routine passes to step 98.

When the routine is directed to step 96 from step 98, the variable LSTIDIAT is set equal to IAT to retain the most recent value of the intake air temperature at engine idle. Next, at step 104, the variable LSTIDMP is set equal to ISWWAC, to retain a value corresponding to the most recent idle setting of the stepping motor 20. The values for these two variable LSTIDIAT and LSTIDMP are updated and retained in the non-volatile memory of computer 22. The routine then passes to step 90.

If the routine is directed to step 98 from step 94, then a decision is required as to whether the flag ACOFFON equals one. Recall that this ACOFFON flag was set to a value of one, at step 60 in the routine illustrated in FIG. 3, to indicate that the air conditioning request switch has just been switch from the off to the on state. In this portion of the routine, when ACOFFON flag is equal to one, this indicates that the air conditioner has been switched from the off to on state, and the engine is operating off-idle. This is the special case discussed previously, where the most recently retained idle values for the intake air temperature and corresponding setting for the stepping motor 20, are to be replaced with the current values of the intake air temperature and stepping motor setting. This is accomplished by proceeding to step 102, when ACOFFON equals one. When ACOFFON does not equal one, the routine passes to step 100.

If the routine proceeds to step 102 from step 98, the ACOFFON flag is set to a value of zero, to clear the flag for the next pass through the routine.

Next at steps 96 and 104 the most recent recently retained values for the intake air temperature LSTIDIAT and stepping motor position LSTIDMP are respectively replaced with the current non-idle values for the air intake temperature and the stepping motor position. From step 104, the routine then proceeds to step 90.

When the routine proceeds to step 100 from step 98, the value of a COUNTER is checked to determined whether it exceeds a predetermined COUNT, indicating that at least a predetermined time has elapsed since the previous pass through this portion of the routine. For the first pass through the present routine, COUNTER is initialized to a value of COUNT. If the COUNTER does not have a value of COUNT, the routine proceeds to step 106, where the COUNTER is incremented by one, and the routine is exited at point 114. If COUNTER does have a value of COUNT, the routine passes to step 108.

At step 108, a difference in temperature $\Delta T$ is computed by subtracting the current value of the intake air temperature IAT from the most recently stored value for LSIDIAT (at step 96).

Next at step 110, a value for ΔSTEPS is looked up in a schedule stored in read only memory as a function of the difference in temperature $\Delta T$, found previously at step 108. For the engine 10 and compressor 30 utilized in the preferred embodiment, the values for the stored schedule were derived from the graph presented in FIG. 5. Thus, ΔSTEPS represents the decrease in steps for stepping motor 20 that corresponds to the estimated decrease in the engine load due to the off-idle operation of compressor 30.

Then at step 112, a new value for the variable ISWWAC, the position of stepping motor 20 with compressor 30 operational, is computed by subtracting the value of ΔSTEPS (found at step 110), from the most recently stored value for LSTIDMP (at step 104). This value for ISWWAC is then stored in non-volatile computer memory, for use in setting the value of the BASE IDLE variable and the corresponding position of stepping motor 20.

Step 90 may be entered by way of step 88, 92, 104, or 112. In all cases, the COUNTER is set to a value of zero, which ensures that at least a predetermined period of time will have to elapse before another adjustment to the setting of the engine power control mechanism (position of stepping motor 20) can be made based upon the computed temperature difference $\Delta T$. This predetermined time is essentially equal to the time it take for the routine to increment the COUNTER from zero to a value of COUNT. In the preferred embodiment, this predetermined time is approximately equal to 10 seconds, which was found to be the approximate time required for any significant change to occur in the temperature of the engine intake air.

In summary, the steps of the routine illustrated in FIG. 6 provide for the adjustment of the engine output power to compensate for the change in engine loading associated with the off-idle operation of the variable capacity refrigerant compressor 30.

The aforementioned description of the preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. For an internal combustion engine adapted to drive a variable capacity refrigerant compressor of a vehicle air conditioning system, the compressor having a minimum capacity upon starting, and a variable capacity thereafter, to maintain a predetermined refrigerant pressure, the engine having an intake air system for inducting engine air and an idle speed control system, wherein the output power of the engine is regulated by adjusting the setting of a power control mechanism to achieve a desired rotational speed under idling conditions, a method for adjusting engine output power to compensate for the variations in engine loading induced by the variable capacity refrigerant compressor, the steps of the method comprising:

deriving an indication of the engine intake air temperature;

deriving an estimate for the variation in engine loading induced by the variable capacity refrigerant compressor from a schedule of values based upon the indicated engine air intake temperature when the variation in engine loading is induced by starting the operation of the variable capacity refrigerant compressor, and the estimate is derived from the same schedule of values when the variation in engine loading is induced by stopping the operation of the variable capacity refrigerant compressor.

adjusting the setting of the engine power control mechanism, in accordance with the estimate for the variation in engine loading.

2. For an internal combustion engine adapted to drive a variable capacity refrigerant compressor of a vehicle air conditioning system, the compressor having a minimum capacity upon starting, and a variable capacity thereafter, to maintain a predetermined refrigerant pressure, the engine having an intake air system for inducting engine air and an idle speed control system, wherein the output power of the engine is regulated by adjusting the setting of a power control mechanism to achieve a desired rotational speed under idling conditions, a method for adjusting engine output power to compensate for the variations in engine loading induced by the variable capacity refrigerant compressor, the steps of the method comprising:

deriving an indication of the engine intake air temperature;

deriving an estimate for the variation in engine loading induced by the variable capacity refrigerant compressor based upon the indicated engine intake air temperature; and adjusting the setting of the engine power control mechanism, in accordance with the estimate for the variation in engine loading, wherein:

the setting of the power control mechanism is adjusted to increase engine output power in accordance with a scheduled value based on intake air temperature, when the air conditioning system is switched from an off to an on state and the engine is functioning according to a first set of predetermined operating conditions; and the setting of the power control mechanism is adjusted to decrease engine output power, when the air conditioning system is switched from an on to an off state, in accordance with (A) the scheduled value reduced by a prescribed offset, if the engine is operating according to a second set of predetermined operating conditions and a predefined time has elapsed since the air conditioning system was last switched from the on to off state, (B) the scheduled value without the offset, if the predefined time has not elapsed, and (C) the scheduled value without the offset, if the predefined time has elapsed and the engine is not operating in accordance with a second set of predetermined engine operating conditions.

3. For an internal combustion engine adapted to drive a variable capacity refrigerant compressor of a vehicle air conditioning system, the compressor having a minimum capacity upon starting, and a variable capacity thereafter, to maintain a predetermined refrigerant pressure, the engine having an intake air system for inducting engine air and an idle speed control system, wherein the output power of the engine is regulated by adjusting the setting of a power control mechanism to achieve a desired rotational speed under idling conditions, a method for adjusting engine output power to compensate for the variations in engine loading induced by the variable capacity refrigerant compressor, the steps of the method comprising:

deriving an indication of the engine intake air temperature;

deriving an estimate for the variation in engine loading induced by the variable capacity refrigerant compressor based upon the indicated engine intake air temperature, wherein the estimate for engine loading is derived as a function of the difference between the indicated intake air temperature and a previously indicted value for the intake air temperature, when the engine is not operating at idle and the variable capacity compressor is operational; and adjusting the setting of the engine power control mechanism, in accordance with the estimate for the variation in engine loading.

4. For an internal combustion engine adapted to drive a variable capacity refrigerant compressor of a vehicle air conditioning system, the compressor having a minimum capacity upon starting, and a variable capacity thereafter, to maintain a predetermined refrigerant pressure, the engine having an intake air system for inducting engine air and an idle speed control system, wherein the output power of the engine is regulated by adjusting the setting of a power control mechanism to achieve a desired rotational speed under idling conditions, a method for adjusting engine output power to compensate for the variations in engine loading induced by the variable capacity refrigerant compressor, the steps of the method comprising:

deriving an indication of the engine intake air temperature;

deriving an estimate for the variation in engine loading induced by the variable capacity refrigerant compressor based upon the indicated engine intake air temperature;

adjusting the setting of the engine power control mechanism, in accordance with the estimate for the variation in engine loading; and retaining a value for the setting of the power control mechanism and a value for the corresponding indication for intake air temperature, when (A) the engine is operating under idling conditions with the variable capacity refrigerant compressor operational, and (B) the air conditioning system is switched from an off to an on state, and the engine is not operating under idling conditions.

5. The method described in claim 4, wherein the setting of the power control mechanism is adjusted to the most recently retained value of the setting, decreased by a schedule amount that depends upon the difference between the indicated intake air temperature and the most recently retained value for the indicated intake air temperature, when (A) the variable capacity refrigerant compressor is operational with the engine not operating under idling conditions, and (B) at least a predetermined period of time has elapsed since the power control mechanism was last adjusted based upon a previous difference between the indicated intake air temperature and the retained value for the intake air temperature.

* * * * *